(12) United States Patent
Disson et al.

(10) Patent No.: US 8,920,529 B2
(45) Date of Patent: Dec. 30, 2014

(54) FILTER INSERT

(75) Inventors: Ralf Disson, Leutenbach (DE); Dieter Goldmann, Markgroeningen (DE); Rainer Handel, Stuttgart (DE); Thilo Rother, Stuttgart (DE); Falko Schwoerer, Stuttgart (DE); Matthias Traub, Boeblingen (DE); Hendrik Von Merkatz, Remseck (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/704,534

(22) PCT Filed: Jun. 14, 2011

(86) PCT No.: PCT/EP2011/059840
§ 371 (c)(1),
(2), (4) Date: Mar. 4, 2013

(87) PCT Pub. No.: WO2011/157706
PCT Pub. Date: Dec. 22, 2011

(65) Prior Publication Data
US 2013/0152528 A1 Jun. 20, 2013

(30) Foreign Application Priority Data
Jun. 16, 2010 (DE) .................. 10 2010 023 973

(51) Int. Cl.
*B01D 46/10* (2006.01)
*B01D 46/00* (2006.01)
*B01D 46/42* (2006.01)
*B01D 46/52* (2006.01)

(52) U.S. Cl.
CPC .......... *B01D 46/0005* (2013.01); *B01D 46/106* (2013.01); *B01D 46/4236* (2013.01); *B01D 46/521* (2013.01); *B01D 46/103* (2013.01); *B01D 46/0006* (2013.01)
USPC .................. 55/480; 55/493; 55/497; 55/501; 55/511; 55/521

(58) Field of Classification Search
CPC .......... B01D 46/2411; B01D 46/2414; B01D 46/521
USPC .......... 55/480, 493, 503, 497, 499, 501–502, 55/511, 521, 524
See application file for complete search history.

(56) References Cited

U.S. PATENT DOCUMENTS

| | | | |
|---|---|---|---|
| 4,617,122 A * | 10/1986 | Kruse et al. | 210/493.3 |
| 4,640,698 A | 2/1987 | Ohishi et al. | |
| 8,157,883 B2 | 4/2012 | Felber et al. | |
| 2008/0060993 A1 * | 3/2008 | Yano | 210/442 |
| 2008/0120953 A1 | 5/2008 | Volkmer et al. | |
| 2010/0154369 A1 * | 6/2010 | Berisha et al. | 55/493 |

FOREIGN PATENT DOCUMENTS

| | | |
|---|---|---|
| DE | 10328002 A1 | 1/2005 |
| DE | 202005003046 U1 | 7/2006 |
| DE | 102007024287 A1 | 11/2008 |
| DE | 202008013309 U1 | 3/2009 |
| EP | 1946811 A1 | 7/2008 |
| EP | 2135662 A1 | 12/2009 |
| GB | 2162087 A | 1/1986 |
| JP | 61-275562 A | 12/1986 |

OTHER PUBLICATIONS

English abstract for JP61-275562.

* cited by examiner

*Primary Examiner* — Robert Clemente
*Assistant Examiner* — Karla Hawkins
(74) *Attorney, Agent, or Firm* — Rader, Fishman & Grauer PLLC

(57) ABSTRACT

A filter housing may include a filter insert configured to be inserted into the filter housing. The filter insert may have two spaced and opposite base discs and a filter wall configured to connect edge zones of the base discs. The filter insert may be penetrated by an opening connected to at least one of an untreated space inlet and clean space outlet of the housing. The opening is arranged in a flange plate connected in a leakproof manner to the base discs and the flange plate may be connected in a leakproof manner to the filter wall.

12 Claims, 4 Drawing Sheets

FILTER INSERT

CROSS-REFERENCE TO RELATED APPLICATIONS

This application claims priority to German Patent Application 10 2010 023 973.9 filed on Jun. 16, 2010, and International Patent Application PCT/EP2011/059840 filed on Jun. 14, 2011, both of which are hereby incorporated by reference in their entirety.

TECHNICAL FIELD

The invention relates to a filter insert which can be inserted into a filter housing, having two mutually opposite base discs, which are spaced apart from each other and substantially parallel to each other, and a filter wall, which connects edge zones of the base discs, is substantially orthogonal to the disc plane and is penetrated by an opening for connection to a fluid or air duct.

BACKGROUND

Such filter inserts are designed in particular for air filter arrangements of large diesel engines, a filter housing being provided for accommodating the filter insert, into which housing the filter insert can be pushed between two housing end walls in the manner of a drawer, the filter insert being guided into a target position by interacting guide profiles on the inner sides of the housing end walls and on the sides of the base discs facing these, in which target position the opening in the filter insert which penetrates the filter wall connects to an untreated space inlet or a clean space outlet of the filter housing. Correspondingly, the interior of the filter insert which is enclosed by the base discs and the filter wall forms either the untreated space or the clean space of the filter arrangement, while a spacing remaining in front of the filter wall inside the filter housing forms the clean or untreated space.

With such a filter arrangement, the filter insert must be an easy-to-handle, stable part, in order to be able to withstand stresses during filter use or filter replacement without problems. It must in particular be ensured that the opening penetrating the filter wall has sufficient stability.

SUMMARY

This object is achieved according to the invention in a filter insert of the type specified in the introduction in that the opening is arranged in a flange plate which is connected in a leakproof manner to the base discs and connects the flange plate in a sealing manner to the filter wall.

It is provided in particular for the connection between the flange plate and the base disc to be formed as a form-fitting connection, in particular a snap connection. This has the advantage that the flange plate having the opening can easily be brought into its target position in relation to the base discs during production of the filter insert, and the base discs and the flange plate form a durable join. Also, the adjacent or abutting zones of the flange plate and base discs are precisely defined by the form-fitting connection, so that the application of a permanent seal between the base discs and the flange plate is made much easier. For example, it is easily possible according to a preferred embodiment of the invention to apply PU foam or similar sealing materials to the connection zones between the flange plate and the base discs. Instead, it is also possible to apply foam or adhesive tracks to the connection regions before joining the base discs and flange plate, in order to seal off the joins remaining on the form-fitting connection securely.

Furthermore, it is expedient if column-like connecting bodies are arranged between the base discs inside the space enclosed by the filter wall, so that a compression- and tension-resistant coupling is ensured between the base discs and the filter wall remains largely free of such stresses.

In order to be able to offer a large filter area, a pleated web of filter material is preferably provided for the filter wall, the pleat folds and fold backs being aligned substantially orthogonally to the base discs. For a clean attachment of the filter material to the flange plate, it is provided for spikes, which engage in at least one, preferably a plurality of pleat folds, to be arranged or formed on the flange plate, so that a form-fitting attachment is also ensured here. To seal off the connection of the flange plate to the filter wall, adhesive foams or tracks can be applied to the above-mentioned spikes or in the interspaces between the spikes, which then ensure a reliable and leakproof connection between the flange plate and the filter material when the flange plate is arranged on the base disc.

Furthermore, the flange plate offers a stable base for a inflow or outflow pipe which may be desired at the opening in the interior of the filter insert.

With regard to preferred features of the invention, reference is made to the claims and to the following explanation of the drawing, using which a preferred embodiment of the invention is described in more detail.

Protection is claimed not only for specified or described combinations of features but also for in principle any desired combinations of the specified or described individual features.

DETAILED DESCRIPTION

Figure 1:
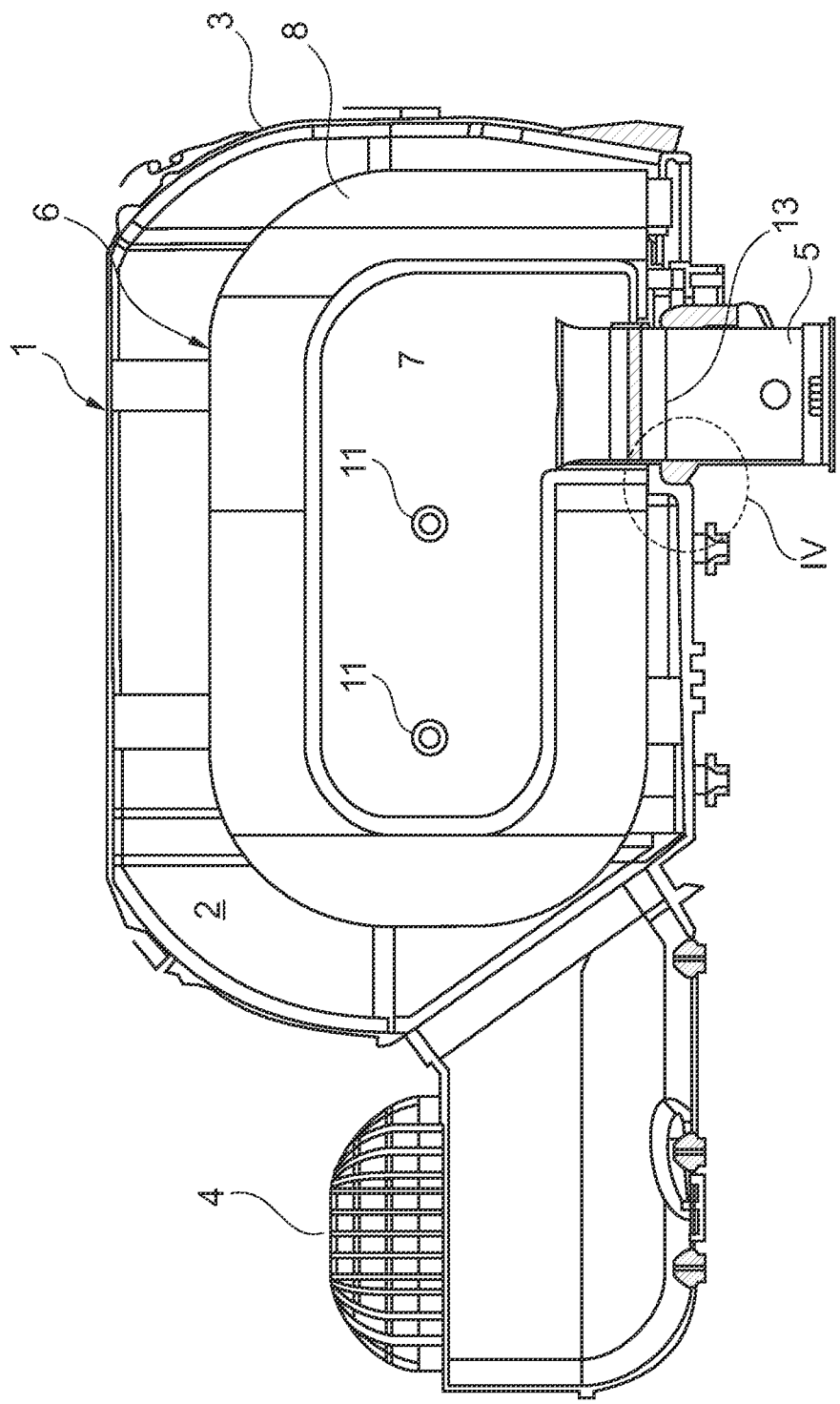
FIG. 1 shows a partially cut away diagram of an air filter arrangement, in the housing of which a filter insert according to the invention is arranged.

The air filter arrangement shown in FIG. 1 has a housing 1 having end walls 2 parallel to the drawing plane and a circumferential wall 3 which connects the end walls 2. An untreated space inlet 4 and a clean space outlet 5 are arranged on the circumferential wall.

Figure 2:
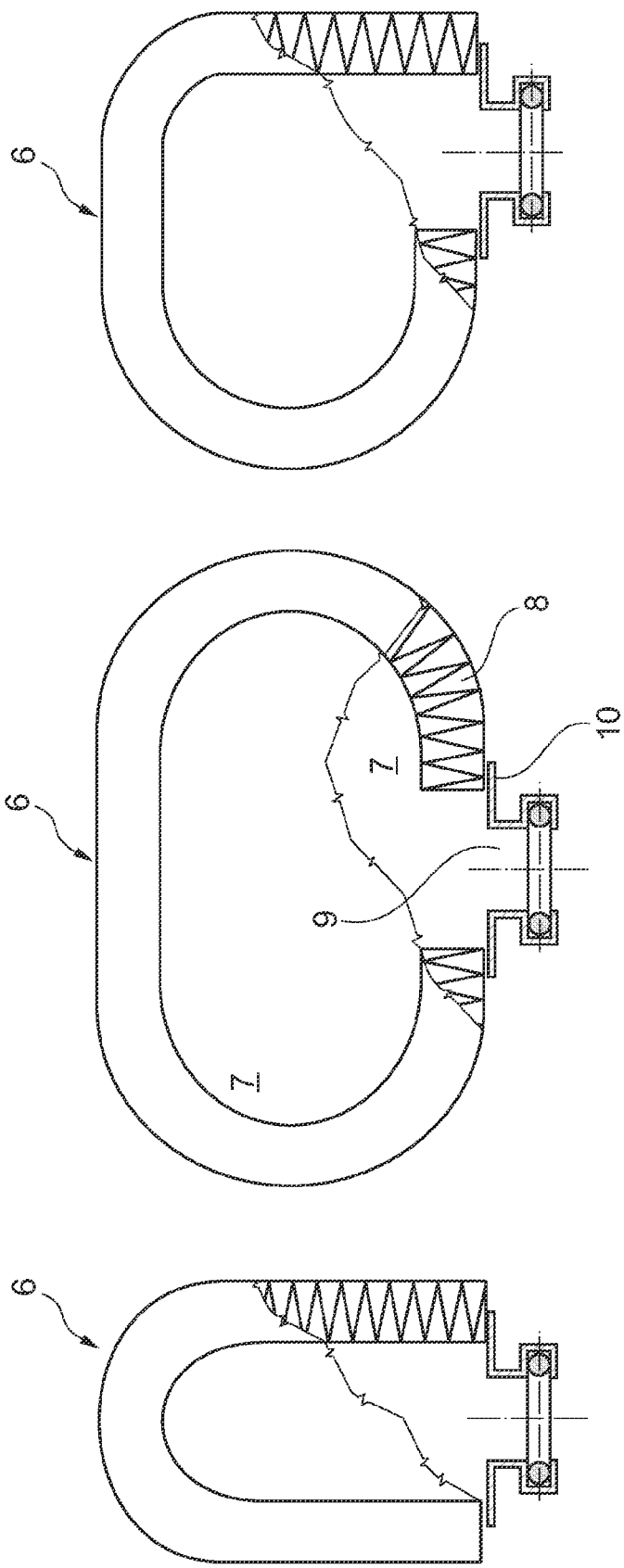
FIG. 2 shows a schematised, partially cut away plan view of filter inserts with different shapes.

Inside the housing 1 there is a filter insert 6 having two base discs 7 which are adjacent to the inner sides of the end walls 2 of the housing and a filter wall 8 which is substantially orthogonal to the base discs 7 and is formed according to FIG. 2 by a pleated web consisting of filter material, the pleat folds being aligned substantially orthogonally to the base discs 7. The filter wall 8 is connected in a leakproof manner to the base discs 7 at mutually opposite edge zones of the base discs 7.

The filter wall 8 is penetrated by an opening 9, which is connected in the example shown to the clean space outlet 5, so that the interior of the filter insert 6 forms the clean space and the spacing remaining outside the filter wall 8 inside the housing 1 forms the untreated space. In principle, however, an arrangement is also conceivable in which the interior of the filter insert 6 is provided as the untreated space and the spacing remaining outside the filter insert 6 inside the housing 1 is provided as the clean space. As can be seen in particular in FIGS. 2 and 3, the opening 9 is arranged in a flange plate 10, which is preferably connected in a form-fitting manner to the base discs 7, so that the target position of the flange plate 10 is predefined precisely by the above-mentioned form fit. At the same time the seal between the base discs 7 and the flange plate 10 is made easier. The form-fitting connections can be covered with PU foam or an adhesive track. Instead it is also possible to apply PU foam or adhesive tracks inside a connection region before the flange plate 10 is fastened in a form-fitting manner to the base discs 7, so that the necessary sealing also takes place when the flange plate 10 is arranged on the base discs 7.

To attach the flange plate 10 in a leakproof manner to the pleated filter wall 8, projections or spikes which project or penetrate into the pleat folds can be arranged on the side of the flange plate 10 which faces the filter wall 8, so that a labyrinth-like form fit is present. In addition, PU foam is applied to the side of the flange plate 10 which faces the filter wall 8, in particular to or between the above-mentioned projections or spikes, so that the flange plate 10 is connected in a leakproof manner to the filter wall 8 when it is arranged on the base discs 7.

Figure 3:
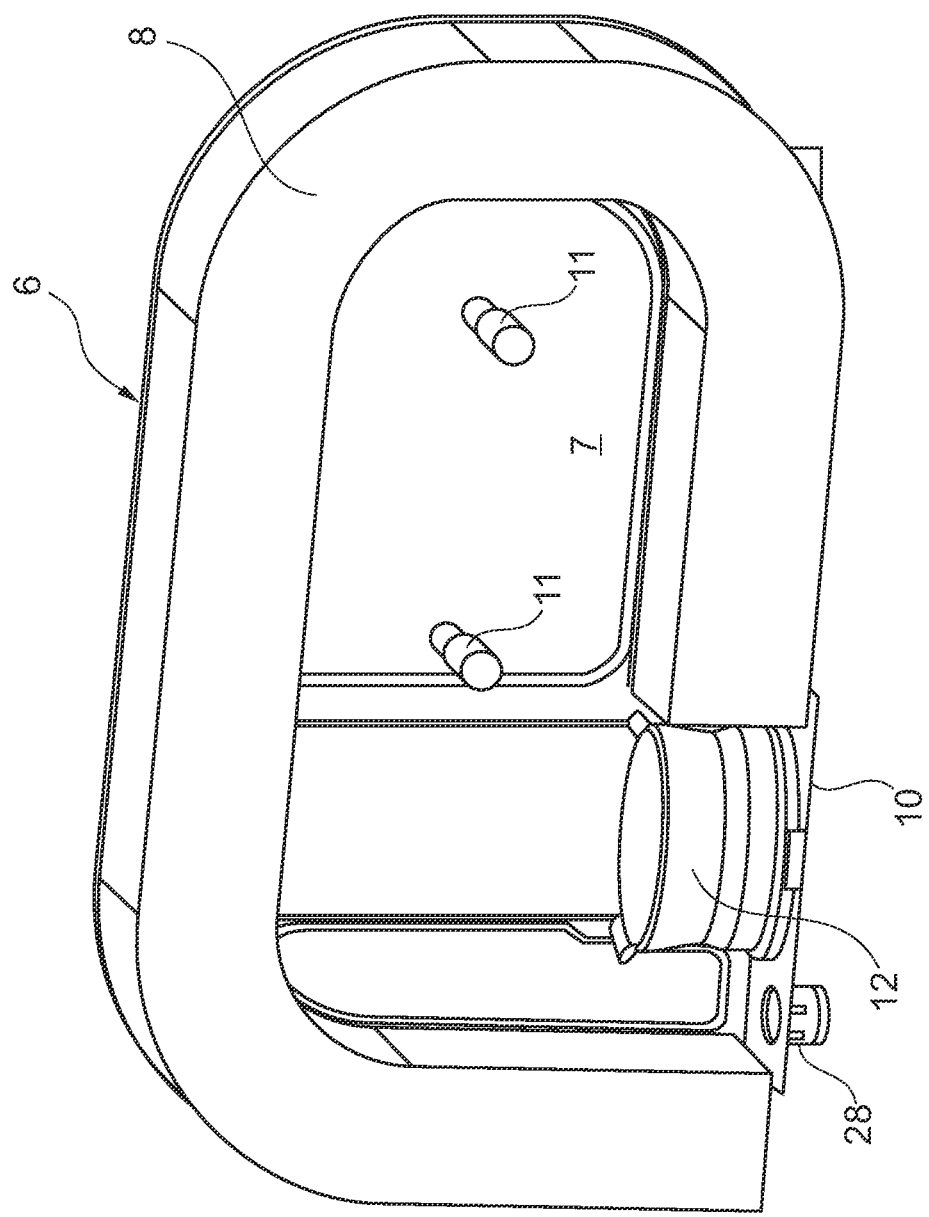
FIG. 3 shows a perspective view of an open filter insert in which a base disc is removed.

As can be seen in particular in FIGS. 1 and 3, column-like connections 11 can be arranged between the base discs 7 inside the space enclosed by the filter wall 8, which connections hold the base discs 7 together in a manner withstanding compressive and tensile stress. Half-columns can be arranged in each case on the base discs 7, which half-columns can be connected non-detachably in a plug-like manner when the filter insert 6 is assembled. The height of the column-like connections 11 is matched to the height of the filter wall 8, so that the latter remains largely stress-free between the base discs 7.

To make the arrangement of the pleated filter wall 8 easier, tracks of PU foam or adhesive can be arranged on the inner sides of the base discs 7, so that when this material hardens corresponding beads are produced, which delimit the space provided for the pleated filter wall 8 in the manner of frames. The end edges of the filter wall 8 are thereby connected in a leakproof manner to the facing sides of the base discs 7 in that the end edges of the filter wall 8 and/or the edge zones of the base discs 7 provided for connection to the filter wall 8 are coated with adhesive or PU foam.

The flange plate 10 can where necessary act as a stable base for an inflow or outflow pipe 12 arranged at the opening 9 of the filter insert 6, in order to optimise the flow conditions inside the filter insert 6.

Furthermore, the flange plate 10 can have a tube-shaped pipe end 28 arranged additionally to the inflow/outflow pipe 12. The pipe end 28 can be arranged parallel as shown or alternatively at an angle to the outflow pipe 12. This pipe end 28 connects the interior of the filter insert 6 to an associated connection in the filter housing 1. Cleaned air can be branched off via this pipe end 28 if it is to be used for another purpose, e.g. secondary air injection. The pipe end 28 is optional and can also be omitted in other embodiments.

An e.g. screen-like safety insert 13 can also be arranged on the pipe end of the clean space outlet 5 of the housing 1, which pipe end penetrates the opening 9 when the filter insert 6 is in the installed state, which safety insert can project to a greater or lesser extent into the interior of the filter insert.

Figure 4:
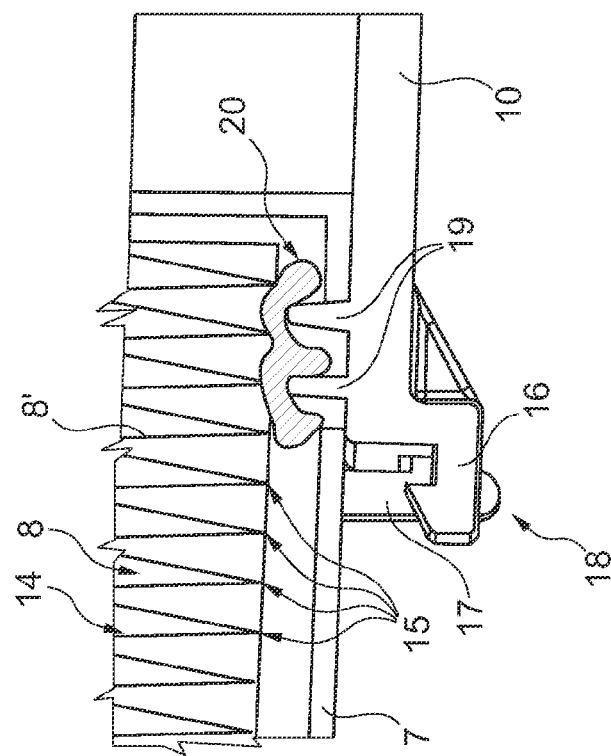
FIG. 4 shows the section IV according to FIG. 1

FIG. 4 shows section IV of FIG. 1. The filter wall 8 consists of a thin, pleated filter medium 8'. The filter medium 8' can for example contain cellulose or be formed by a synthetic fibre nonwoven or from a mixture of cellulose and synthetic fibres. The filter medium 8' has folds 14 with fold backs 15, which run substantially orthogonally to the base discs 7. The flange plate 10 has a snap hook 16, which interacts with a counter-contour 17 arranged on the base disc 7 in order to form a snap connection 18.

Furthermore, the flange plate 10 has two spikes 19, which point in the direction of the fold backs 15. The number of spikes 19 can be varied depending on the desired strength/stability of the filter insert. In this case it is possible to provide only one spike 19 or, for a more stable connection, a greater number, e.g. three to five spikes 19. The spikes 19 are wedge-shaped, with two flat flanks which run at angles to each other. In other configurations, the spikes 19 can also have profiled flanks, which form a Christmas tree-shaped cross section with each other. An adhesive 20 is arranged between the spikes 19 and the fold backs 15, which adhesive produces a sealing connection between the filter medium 8' and the spikes 19 of the flange plate 10. In this exemplary embodiment, the spikes 19 are arranged at a distance from the fold backs 15. The distance between the join partners is bridged by the adhesive 20.

Figure 5:
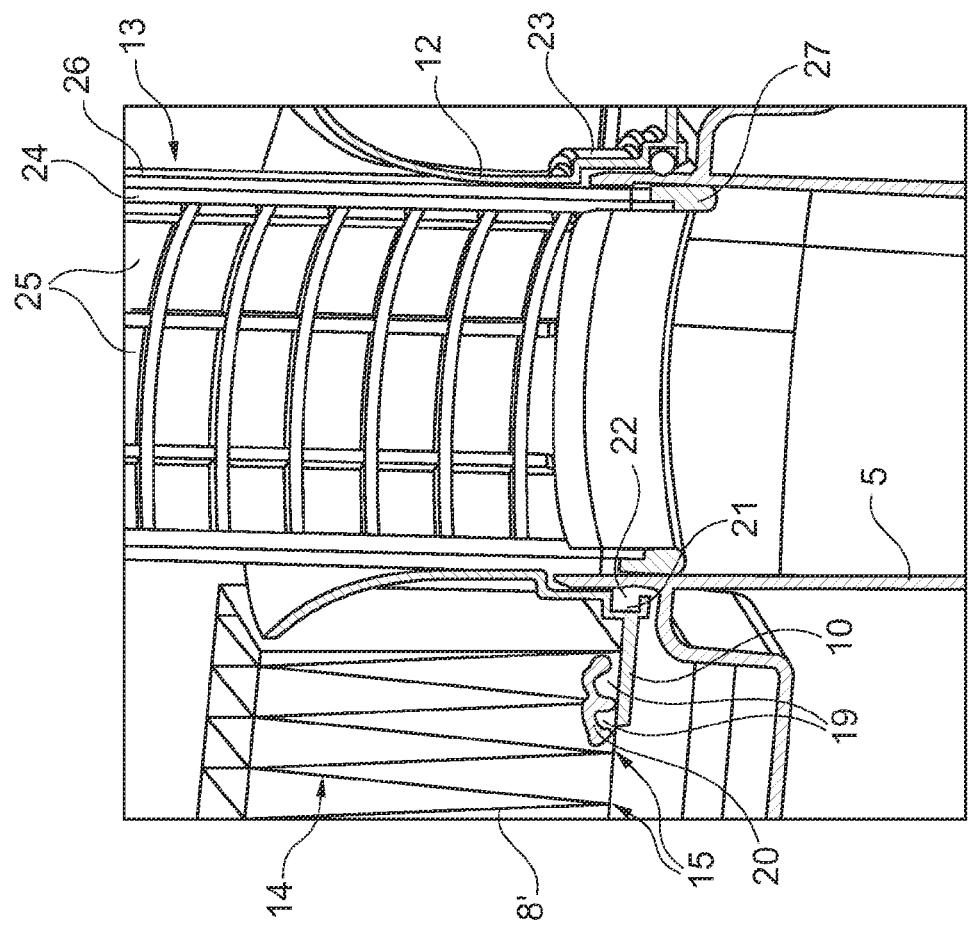
FIG. 5 shows the section IV in an alternative configuration.

FIG. 5 shows section IV of FIG. 1 in an alternative configuration. In principle, the connection of the flange plate 10 to the filter medium 8' corresponds to the connection shown in FIG. 4. The different variants described in connection with FIG. 4 can also be applied to FIG. 5. The difference from FIG. 4 lies in the distance of the spikes 19 from the fold backs 15. In this configuration, the spikes 19 penetrate between the folds 14, as a result of which an overlap region is formed between the spikes 19 and the folds 14. In this overlap region, the adhesive 20 forms the sealing connection between the spikes 19 of the flange plate and the folds 14 of the filter medium 8'. The fold backs 15 can touch the flange plate 10, as shown in FIG. 5. In other exemplary embodiments, the fold backs 15 do not have to be in contact with the flange plate 10. In such embodiments, the fold backs 15 are arranged at any point between the flange plate 10 and the tip regions of the spikes 19.

In the exemplary embodiment shown, the outflow pipe 12 is funnel-shaped, the upper opening of the outflow pipe 12 corresponding to approximately the height h of the filter medium 8'. The cleaned air can thus flow into the clean space outlet 5 without abrupt changes in direction. The outflow pipe 12 furthermore has a seal holder 21, in which an O-ring 22 can be inserted. The filter insert 6 can be pushed in a sealing manner onto the clean space outlet 5 by means of the O-ring 22. Moreover, a circumferential shoulder 23 is arranged on the outflow pipe 12, which shoulder receives the clean space outlet 5 in such a manner that no disruptive contour is formed in the flow path of the cleaned air.

In the embodiment of the invention shown, the safety insert 13 is shown pushed into the clean space outlet 5. The safety insert has a support geometry 24, which is tube-shaped with holes 25. The support geometry 24 does not represent a significant flow resistance. Arranged around the support geometry 24 is a safety filter medium 26, which prevents impurities from passing into the clean space outlet 5 e.g. when the filter is changed or if the filter medium 8' is damaged. To fulfil this task, the safety insert 13 also has another seal 27.

When the filter insert 6 is changed, it can be removed from the housing 1 and the safety insert 13 remains in the clean space outlet 5. In the same manner, the new filter insert 6 can be installed again without the safety insert 13 having to be removed. If the safety insert 13 has to be replaced, the filter insert 6 must be removed from the housing 1 and then the safety insert 13 can be removed. It must then be replaced by a new safety insert 13 before the filter insert 6 can be installed again.

The invention claimed is:

1. A filter housing, comprising:
a filter insert configured to be inserted into the filter housing, the filter insert having two spaced and opposite base discs and a filter wall configured to connect edge zones of the base discs,
wherein the filter insert is penetrated by an opening connected to at least one of an untreated space inlet and a clean space outlet of the housing,
wherein the opening is arranged in a flange plate connected in a leakproof manner to the base discs, and
wherein the flange plate includes at least one projection connecting the flange plate in a leakproof manner to the filter wall.

2. The filter insert according to claim 1, wherein the filter wall is formed as a pleated web of filter material having pleat folds and fold backs which are aligned substantially orthogonally to the base discs, and further wherein the flange plate is connected in a sealing manner to the pleat folds.

3. The filter insert according to claim 1, wherein column-like connecting bodies are arranged between the base discs and configured to connect the base discs to each other in a tension and compression-resistant manner.

4. The filter insert according to claim 1, wherein at least one of a form-fitting and snap connection is formed between the base disc and the flange plate.

5. The filter insert according to claim 1, wherein the flange plate includes a plurality of projections arranged thereon and extending in a direction of a pleat fold of the filter wall.

6. The filter insert according to claim 5, wherein the projections are wedge-shaped.

7. The filter insert according to claim 5, wherein the projections include spikes bridged to the fold backs of the pleat folds by adhesive.

8. The filter insert according to claim 5, wherein an adhesive which forms a sealing connection is arranged between the projections and the filter wall.

9. The filter insert according to claim 1, further comprising at least one of an inflow and outflow pipe arranged on the flange plate and coaxial to the opening and projecting into the filter insert.

10. The filter insert according to claim 1, wherein the flange plate includes a tube-shaped pipe end configured to connect the interior of the filter insert to an additional unit.

11. The filter insert according to claim 4, wherein the flange plate includes a snap hook which interacts with a counter-contour arranged on at least one base disc forming the snap connection.

12. A filter housing, comprising:
a filter insert configured to be inserted into the filter housing, the filter insert having two spaced and opposite base discs and a filter wall configured to connect edge zones of the base discs, the filter wall formed as a pleated web of filter material having pleat folds and fold backs which are aligned substantially orthogonally to the base discs;
wherein the filter insert is penetrated by an opening connected to at least one of an untreated space inlet and a clean space outlet of the housing, the opening is arranged in a flange plate connected in a leakproof manner to the base discs, wherein at least one of a form-fitting and snap connection is formed between the base disc and the flange plate; and
wherein the flange plate includes a plurality of projections extending in a direction of the pleat folds connecting the flange plate in a leakproof manner to the pleat folds of the filter wall.

* * * * *